Figure 1:
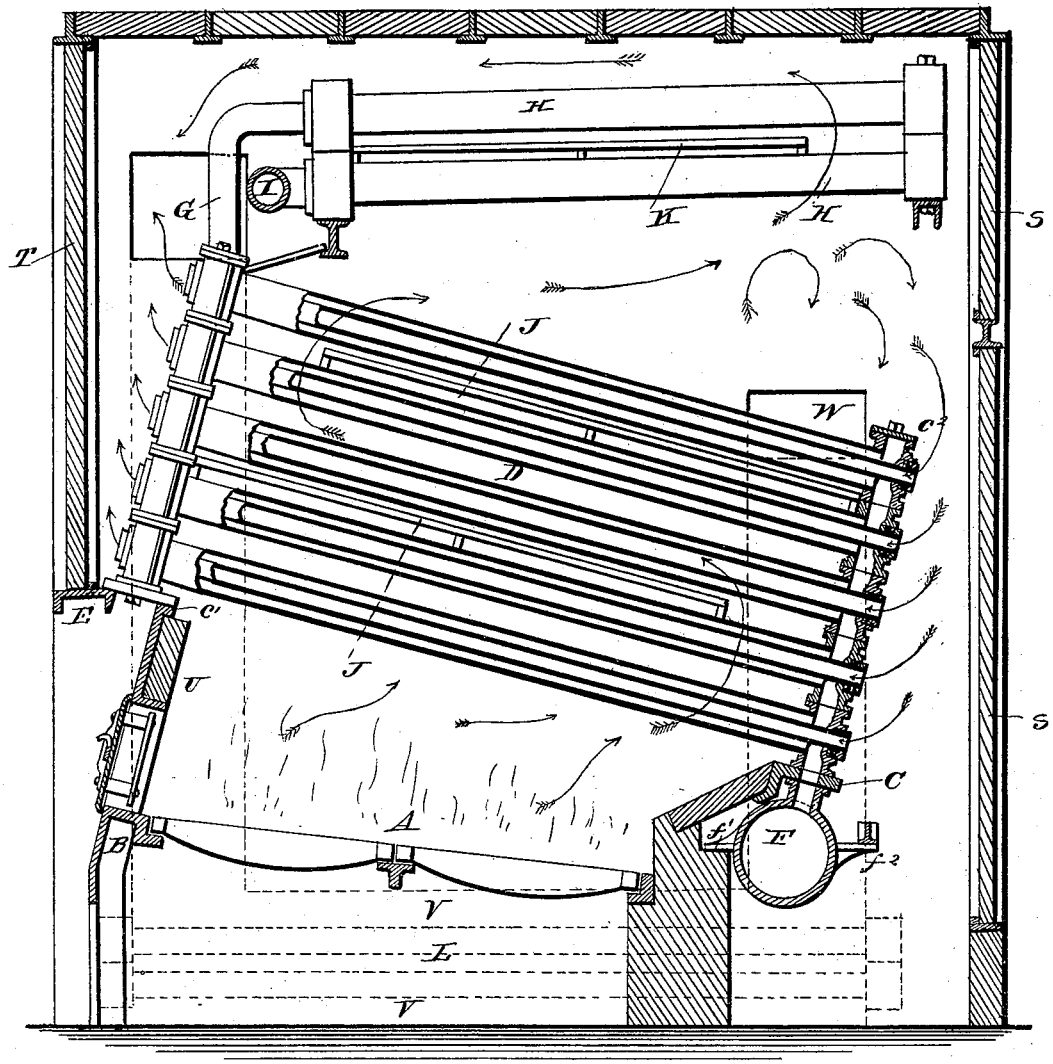

(No Model.) 6 Sheets—Sheet 1.

G. G. M. HARDINGHAM.
STEAM BOILER.

No. 316,032. Patented Apr. 21, 1885.

WITNESSES
Phil C. Dietrich
M. F. Royle

INVENTOR
Geo. G. M. Hardingham
by Thomas D. Stetson
Attorney (No Model.) 6 Sheets—Sheet 2.

G. G. M. HARDINGHAM.
STEAM BOILER.

No. 316,032. Patented Apr. 21, 1885.

WITNESSES
Phil C. Dieterich.
M. F. Boyle.

INVENTOR
Geo. G. M. Hardingham
by Thomas D. Stetson
Attorney (No Model.) 6 Sheets—Sheet 3.
G. G. M. HARDINGHAM.
STEAM BOILER.
No. 316,032. Patented Apr. 21, 1885.
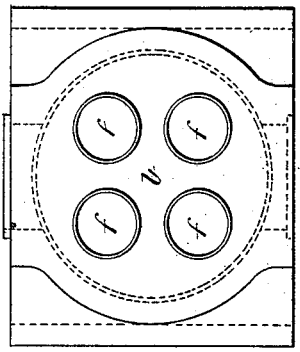
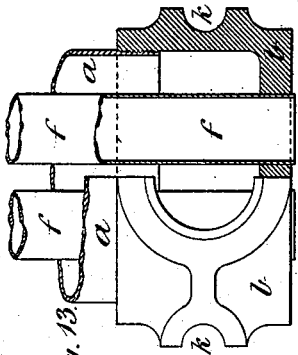
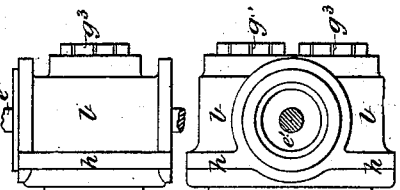
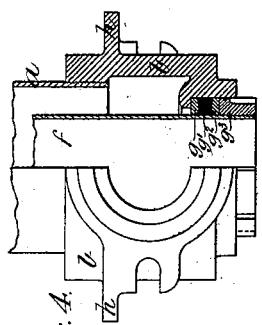
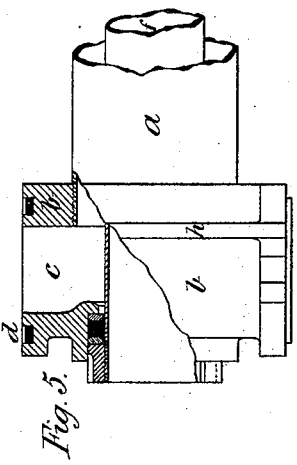
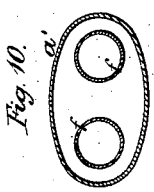
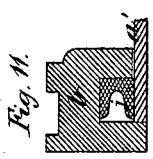
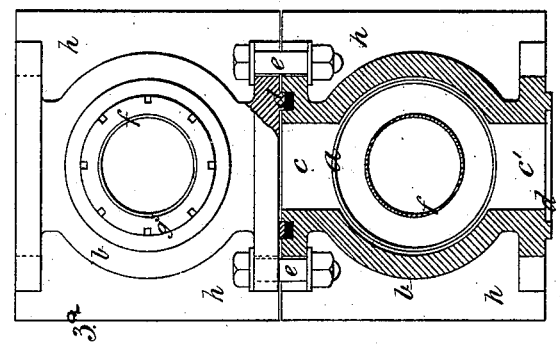
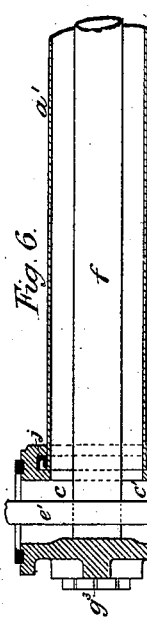
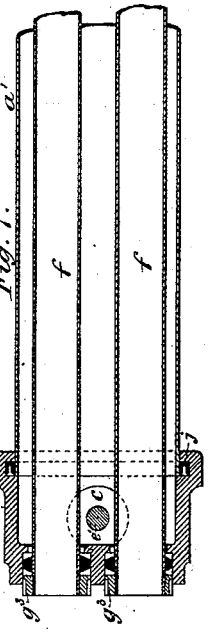
Witnesses.
Jos. Glover
D. Young
Inventor:
G. G. M. Hardingham (No Model.) 6 Sheets—Sheet 4.

G. G. M. HARDINGHAM.
STEAM BOILER.

No. 316,032. Patented Apr. 21, 1885.

Witnesses.
Jos. H. Glover
D. Young

Inventor.
G. G. M. Hardingham (No Model.)  
6 Sheets—Sheet 5.

G. G. M. HARDINGHAM.
STEAM BOILER.

No. 316,032. Patented Apr. 21, 1885.

Witnesses.  
Jos. E. Glover  
D. Young

Inventor.  
G. G. M. Hardingham (No Model.)  
6 Sheets—Sheet 6.

G. G. M. HARDINGHAM.
STEAM BOILER.

No. 316,032. Patented Apr. 21, 1885.

United States Patent Office.

GEORGE G. M. HARDINGHAM, OF 191 FLEET STREET, COUNTY OF MIDDLESEX, ENGLAND.

STEAM-BOILER.

SPECIFICATION forming part of Letters Patent No. 316,032, dated April 21, 1885.

Application filed March 15, 1883. Renewed October 23, 1884. (No model.) Patented in England October 18, 1882, No. 4,956; in France March 15, 1883, No. 154,316; in Belgium March 15, 1883, No. 44,300; in Austria-Hungary March 15, 1883, No. 10,683 and No. 39,085; in Italy March 15, 1883, No. 15,238; in Spain March 15, 1883, No. 4,108, and in Germany March 15, 1883, No. 26,563.

*To all whom it may concern:*

Be it known that I, GEORGE GALTON MELHUISH HARDINGHAM, civil engineer, a subject of the Queen of Great Britain, residing at 191 Fleet Street, in the county of Middlesex, England, have invented new and useful Improvements in Steam-Boilers, (for which I have obtained provisional protection in Great Britain, No. 4,956, bearing date October 18, 1882,) of which the following is a specification.

My invention relates to the class of steam-boilers commonly called "sectional"—that is to say, boilers whereof the major portions are composed of a number of units closely resembling one another in design and arranged to work in unison, each of such units or sections being of a size, construction, and weight convenient for manufacture, handling, transport, erection, &c., as also for being dismounted, repaired, and replaced when necessary.

Each section of my improved boiler consists of a tube furnished at each end with a chamber or transverse passage, and containing an internal tube or tubes passing longitudinally through the first-named tube and its end chambers. Each such section communicates with that respectively above and below through its end chambers, the joints hereon being so arranged, packed, and fastened as to render the sections readily separable.

In constructing a boiler according to my invention several sections, such as above described, and of uniform length, are piled one above the other, and several piles so formed may be placed side by side, the terminal chambers of one pile being laterally in contact with or close to those of the adjoining pile.

For securing the sections together when formed into a pile I pass between each two piles of laterally-contiguous sections (and outside in the case of an outside pile) a bolt or bar, to which a nut or other adjustable fastening is subsequently applied. Such bolts or bars are introduced at both ends of the sections, and may be conveniently arranged in recesses formed in the sides of the terminal chambers; or connecting-bolts, instead of being applied externally, may be passed through the terminal chambers constituting the extremities of each such pile, in which case I prefer to arrange the bolt so as to traverse the water-ways through which the terminal chambers communicate with one another; or, instead of a continuous bolt or bar being employed for this purpose, independent fastenings may be applied at each joint between the terminal chambers; or, according to another method of construction, the extremities of any two sections required to communicate with one another present faces perpendicular to the axes of the said sections, to which faces are applied hollow connecting-pieces extending from the face of one section to that of the next, and serving also to secure such sections together. In any case the joints between the sections are provided with caoutchouc or asbestus rings or washers, or other suitable packing of a somewhat yielding character, and when continuous bolts are employed, as hereinbefore described, I prefer to interpose a strong spring under the head or nut of such bolt in order to permit of the terminal chambers expanding under increased temperature without unduly compressing the packings or straining the bolt.

According to the power the boiler is required to develop, a sufficient number of sections constructed and connected with one another as herein described are suitably arranged relatively to the fire-grate. The terminal chambers are by preference of rectangular or hexagonal shape in face view, (or are made up by means of wings to such shape,) so that, being in contact with or close to one another both altitudinally and laterally, they leave no important interstices through which the products of combustion can escape endwise, but form a practically compact wall at each extremity of the fire-chamber, through which the products of combustion first pass, and in which the outer surfaces of the external tubes are exposed to the heat. The products of combustion then pass over or around one of the said end walls, described above as composed of terminal chambers, and gain access to the internal tubes of the various sections, through which the said products pass, and ultimately find their way to the smoke-flue or chimney.

To promote effective distribution of the heat throughout the fire-chamber and among the external tubes, directing-plates may be interposed between the rows of sections in such a manner as to cause the products of combustion to follow a zigzag or circuitous course before reaching the internal tubes. In cases where the internal tubes are of inadequate area to permit the passage of the whole of the products of combustion with sufficient freedom, I cause only a portion thereof to traverse the internal tubes and the remainder to pass by another route or routes to the chimney, this portion being utilized, however, for superheating the steam, or for heating the feed-water, or for both or other useful purposes. By a somewhat different arrangement of the sections relatively to the furnace the products of combustion may, if preferred, be caused to pass first through the internal tubes and subsequently among the external tubes.

In order to effect the application of the heat primarily to the external tube-surface and ultimately to the internal tube-surface, or vice versa, the boiler is partially or wholly enclosed in a brick-work or other suitable casing. At the ends of this casing doors may be arranged to open and permit of the sections or of their fastenings or inner tubes being examined, removed, repaired, or renovated, or of the interior of the tubes being cleaned.

Figure 2:
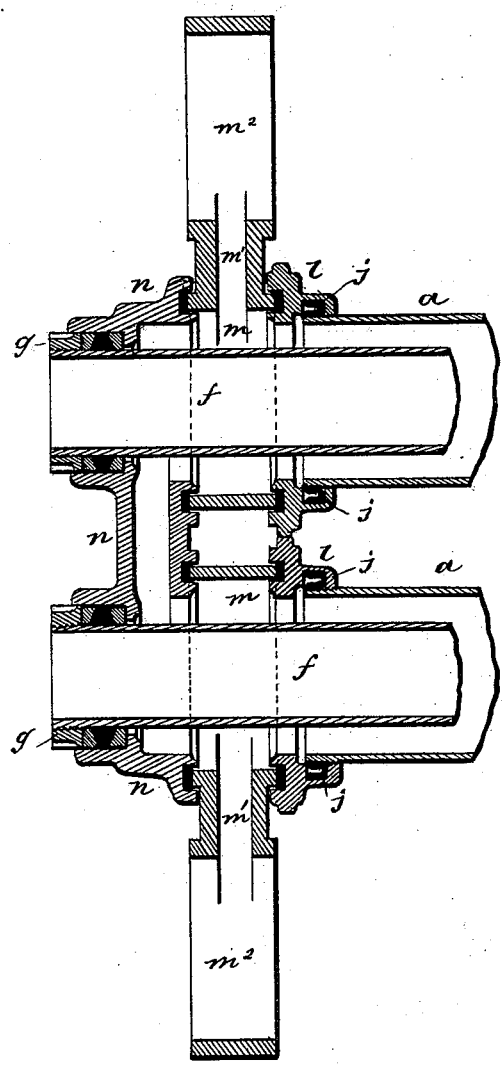
Figure 3:
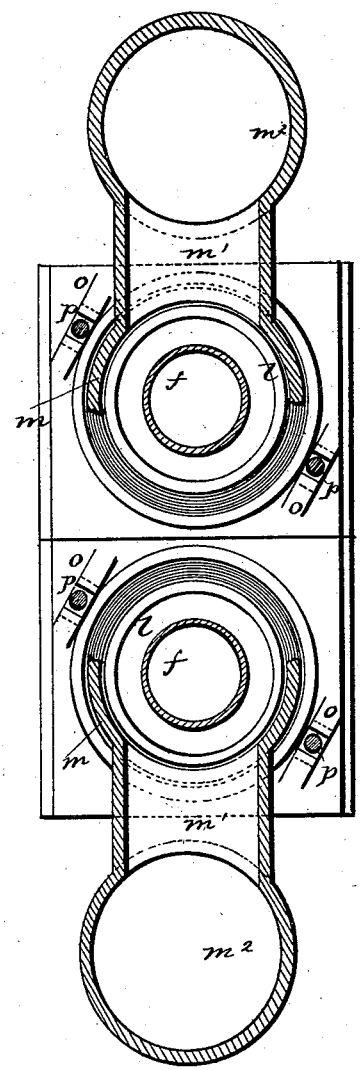
Figure 14:
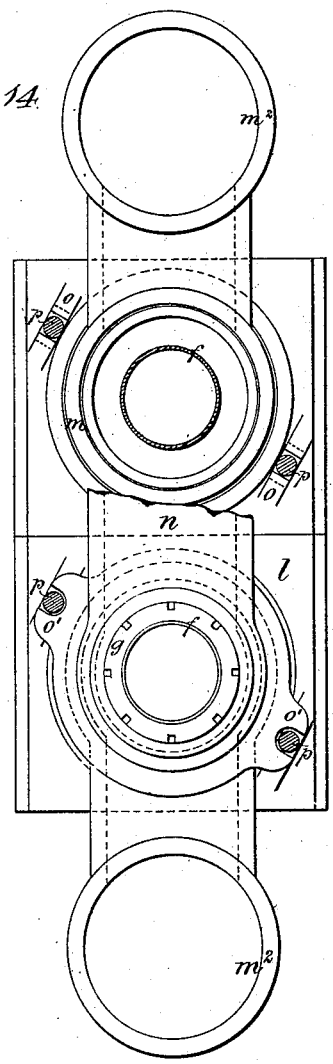
Figure 15:
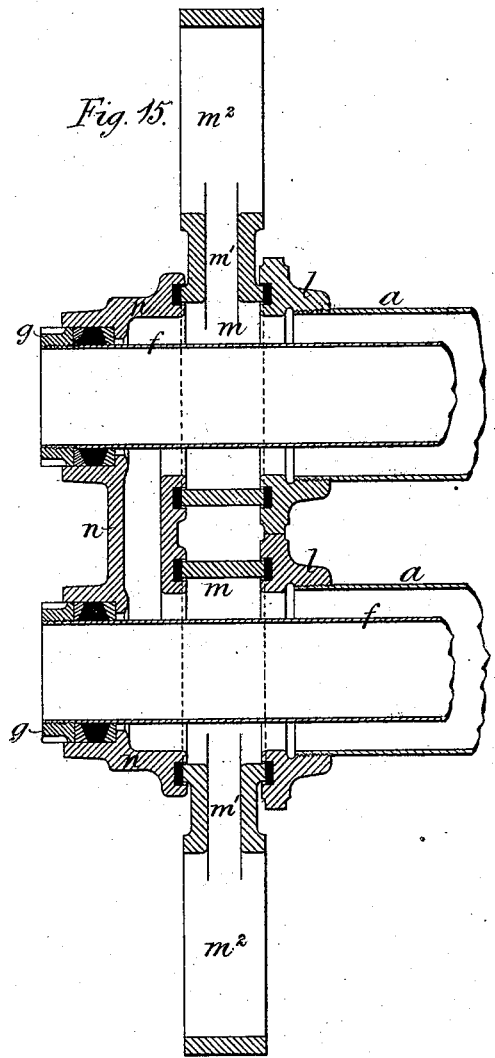
Figure 16:
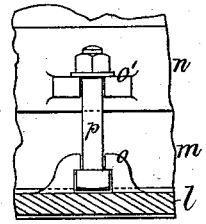
Figure 17:
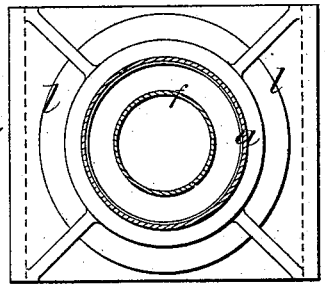
Figure 18:
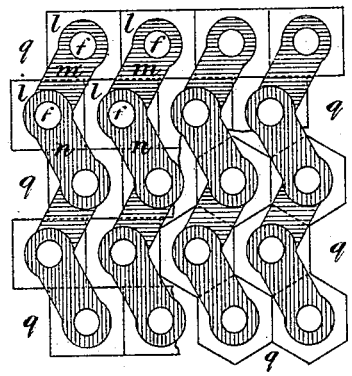
Figure 20:
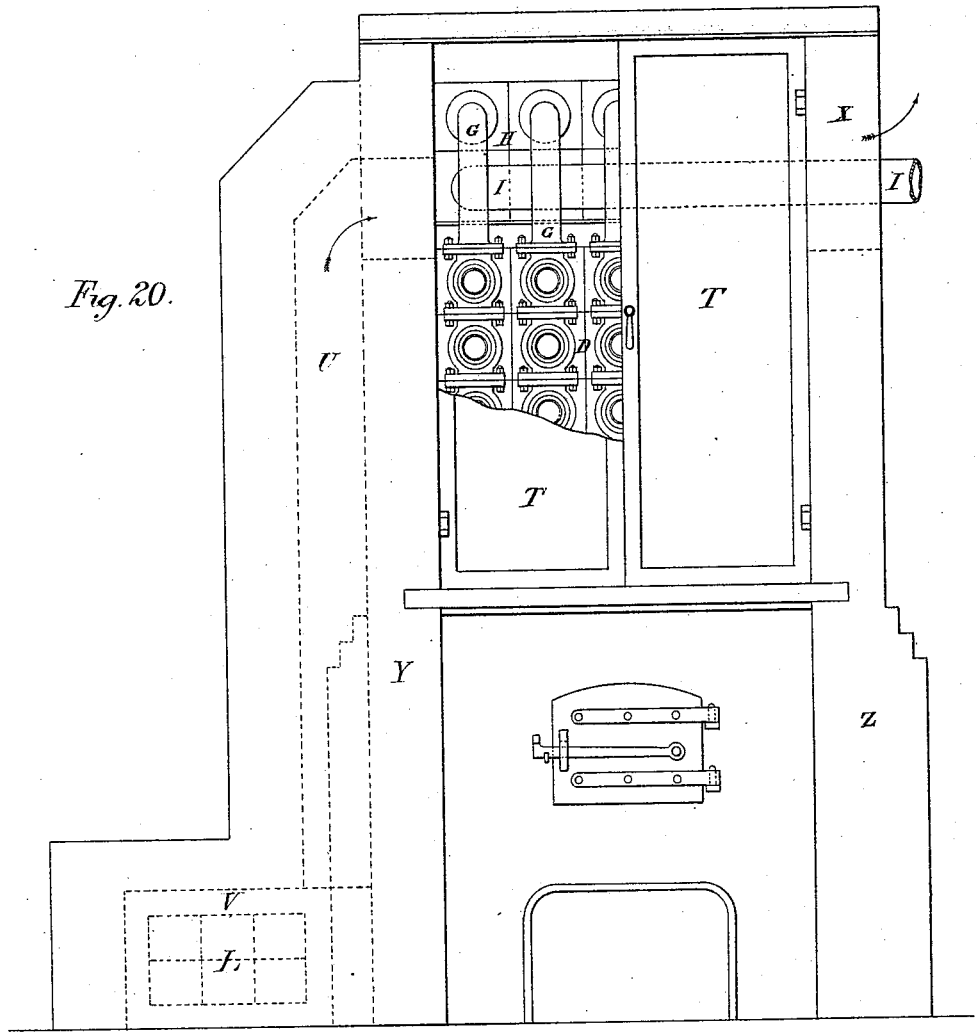
Figure 19:
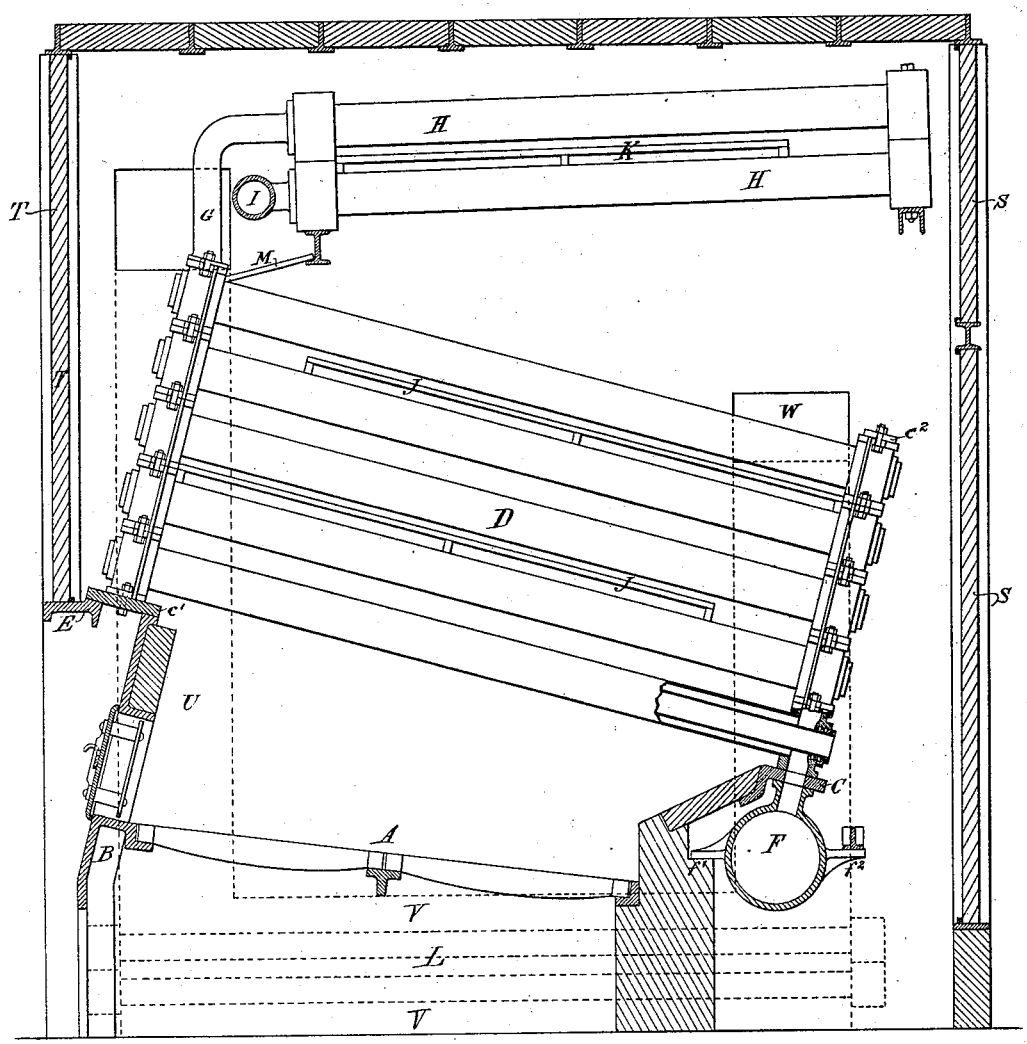

In the drawings, Figure 1 is a vertical section through the entire boiler. Fig. 2 is a corresponding section through a portion on a larger scale; and Fig. 3 is an end elevation, partly in section, corresponding to Fig. 2. The remaining figures show modifications and aid to illustrate the novel features more fully. Fig. $3^a$ is an end elevation, partly in section. Fig. 4 is a plan, partly in section, corresponding to Fig. 3. Fig. 5 is a side elevation, partly in section, corresponding to Figs. 3 and 4. Fig. 6 is a vertical horizontal section. Fig. 7 is a corresponding section. Fig. 8 is a corresponding side elevation. Fig. 9 is a corresponding plan view. Fig. 10 is a corresponding cross-section. Fig. 11 is a section on a larger scale, showing the mode of forming what I term the "cup-packing" between the outer tube and the corresponding end chamber in any of the forms of the invention. Fig. 12 is an end elevation. Fig. 13 is a corresponding plan view, partly in section. Fig. 14 is an end elevation. Fig. 15 is a corresponding vertical section. Fig. 16 is a side elevation showing the fastening which may be used in this and other forms of the invention, and Fig. 17 is a cross-section. Fig. 18 is a diagram showing a peculiar arrangement of the terminal chambers. Fig. 19 is a section through the entire boiler nearly corresponding to Fig. 1, but with only a portion of the invention and Fig. 20 is a corresponding front elevation, with a portion of the casing broken away to show the end chambers.

The figures represent the novel parts with so much of the ordinary parts as is necessary to show their relation thereto.

In Figs. 1, 2, and $2^a$ the outer or water tubes, which receive the heat from the products of combustion on their exterior portions, are marked $a$, and the inner or fire tubes, which conduct a portion of the hot gases through the water within the water-tubes, are marked $f$. The end castings, which unite with the tubes $a$, are marked $l$. The three-part castings, which connect certain end sections, are marked $m, m'$, and $m^2$, and certain additional castings, which connect the pairs thus united with other pairs above or below, are marked $n$. These features and others of importance, will be described minutely in referring to the other figures. The cup-leather packings are marked $j$. The superheater-tubes are marked H, the pipe which carries away the steam is marked I, and an upper deflecting-plate or baffle-plate, which compels a portion of the gases to be detained and drawn through the tubes $f$, while allowing a portion to pass by another passage to the discharge-flue U, is marked K.

A is the fire-grate, and B the front frame. C is a stiff bar carried at its extremities in the side walls, Z Y. Upon this bar is mounted one end of the boiler D; the other end thereof rests upon the front frame, B, or upon a transverse bar, E, similarly carried in the side walls, or upon both these supports, and is free to slide longitudinally thereon, as expansion and contraction, due to variation of temperature, take place. A chamber or drum, F, carried at $f' f^2$, receives the feed-water and distributes the same to the several piles of sections composing the boiler. These are retained in position laterally by being attached to the fixed plate C at one end and the sliding plate $c'$ at the other end. They may also be connected together at their upper back ends by the plate $c^2$. From the upper front end of each pile of sections a pipe, G, passes to a superheater, H, which the steam traverses before reaching the main steam-pipe, I. The heated products arising from the combustion of the fuel on the grate A circulate among the outer tubes, passing round the ends of the directing-plates J J. The plate M preventing the escape of the products of combustion direct to the flue or chimney X, a portion thereof passes over or around the back end of the boiler D and gains access to the internal tubes of the various sections, through which the products pass to the front of the boiler, and thence to the said flue or chimney X. Another portion of the products of combustion operate on the superheater H, and, passing round the end of the directing-plate K, also find their way to the flue, while the remainder are led by a flue, W, to a chamber, V, which they traverse before escaping by the flue U to the main flue X. In the chamber V is arranged a feed-water heater, L. The front of the chamber inclosing the boiler is provided with a door or doors, T, and the back thereof with doors S S.

In Figs. 3, 4, and 5 is represented in detail one mode in which I construct the sections of my improved boiler, Fig. 3ª being partly an end elevation of, and partly a transverse section through, the terminal chamber of such sections; Fig. 4, a part plan and part horizontal section thereof, and Fig. 5 a part side elevation and part vertical section thereof. $a$ is the outer tube, screwed in the terminal chamber $b$. This chamber is provided with water-ways or passages $c\,c'$, and is connected, by packed joints $d$, with the sections above and below, respectively, being fastened thereto by means of bolts and nuts $e$ or their equivalents. The opposite end of the outer tube being provided with a terminal chamber of similar construction an inner or fire tube, $f$, traverses the said outer tube and end chambers. The extremities of the inner tube may be secured in the outer faces of the terminal chambers in various ways; but, in order to render the said inner tube readily removable, I prefer to provide it with gland-packings of the type indicated, wherein the orifice in the outer face of the terminal chamber is considerably larger in diameter than the inner tube, (which can thus be removed when incrusted with scale,) while the stuffing-box is fitted with a loose ring, $g$, underneath the soft packing $g'$, a second loose ring, $g^2$, being interposed between the latter and the screw-gland $g^3$.

$h\,h$ are wings extended laterally for the purpose of intercepting the passages which would otherwise exist between the terminal chambers of the contiguous sections, and through which the products of combustion would escape longitudinally.

Fig. 10 shows, in transverse section, (as regards the tubes,) another mode in which I construct compound water and fire tube sections for sectional boilers. According to this modification I substitute for the external cylindrical tube ($a$ in the foregoing description) an elliptical or flattened tube, $a'$, it being well known that the area of an ellipse or of a circle when flattened is smaller than that of a true circle of equal circumference. In other words, for a given volume or weight of water in the tubes I obtain, by using external tubes of this form, a relatively larger heating-surface. When employing this type of external tube, I prefer to introduce two internal fire-tubes, $f\,f$, which pass through terminal chambers $b$ of a character similar to those previously described, and, together with the external tube, are secured in position relatively to such chambers and tube by gland-nuts $g^3$ or other suitable fastenings. In jointing the terminal chambers to the outer tube I employ an automatic packing on the cup-leather principle. This is shown to an enlarged scale in Fig. 11, where $a'$ is the end of the outer tube. $b$ is a portion of the terminal chamber provided internally with a recess or groove in which is located the ring $j$, formed of caoutchouc and asbestus or other pliable and suitable material. The fluid under pressure finds its way into the interior of the cup-packing $j$, and the usual effect ensues. In connecting sections of the present description together a through-bolt, $e'$, may be employed, traversing the radial water-ways $c\,c'$ of a series of terminal chambers, and passing between each pair of internal tubes contained in the sections severally.

Fig. 12 represents an end elevation, and Fig. 13 a part plan and part horizontal section, of a further modification. In this instance the outer or water tube, $a$, and its terminal chambers $b$ are traversed by four internal or fire tubes, $f$, the extremities whereof are shown (by way of example) expanded in the tube-plates of the said chambers in accordance with one of the modes commonly employed for fixing boiler-tubes. In this illustration provision is made for securing the sections together by means of continuous bolts applied externally, as hereinbefore referred to, the recesses $k\,k$ being intended for the reception of such bolts.

Figs. 14 and 15 are illustrative of another method I employ in constructing and connecting together the sections of my improved boiler, the former being a front view of two such sections (the upper portion of the outer connecting-piece being removed) and the latter a vertical section.

$a\,a$ are extremities of the outer tubes of two adjacent sections, which (as before) are required to communicate with each other and respectively with the sections next above and next below. The tube $a$ is screwed or fastened in a socket-plate, $l$, which presents a face perpendicular to the axis of the said tube.

To the packed face of the socket-plate is applied a short cylinder tube or ring, $m$, communicating, by means of a radial passage, $m'$, with a similar cylinder, $m^2$, intended to occupy a corresponding position in relation to the next section either above or below, as the case may be.

To the outer face of the short cylinder $m$ is applied the packed face of a connecting-piece, $n$, the latter communicating, by means of a similar packed face, with the inner connecting-piece of the section next in order, but in the opposite direction to that in which the inner connecting-piece, previously referred to, communicates directly. An inner or fire tube, $f$, traverses the external tube, $a$, and socket-plate $l$, as well as the inner and outer connecting-pieces, and is packed with a screw-gland, $g$, or other suitable fastening in the external face of the outer connecting-piece, $n$. On tightening the said gland upon the inner tube the outer connecting-piece is pressed against the face of one of the cylinders $m$ of the inner connecting-piece, while the latter is in turn pressed against the face of the socket-plate $l$. The inner tube being similarly fastened at its opposite end acts as a stay to secure together the three pieces, $l\,m\,n$, of which the terminal chamber may in this instance be deemed to consist. Communication is thus established between the socket of one section and that of another, either by way of the direct passage between the cylinders $m$ and $m^2$ of the inner connecting-piece, or through one of such cylinders, $m$, and the outer connecting-piece, $n$, and thence back through one of the cylinders $m$ of the next inner connecting-piece.

In some instances, in order to reduce or obviate the strain on the inner tube necessary for making steam-tight joints on the faces of the inner connecting-piece, I provide the socket-plate $l$ and the outer connecting-piece, $n$, respectively, with lugs $o\ o'$, and apply bolts and nuts $p$, or equivalent fastenings, by the aid of which the joints referred to may be made secure independently of the inner tube. A side elevation of such a supplementary or alternative fastening is shown in the detached view, Fig. 16.

Fig. 17 represents a transverse section through the outer and inner tubes, $a\ f$, showing the socket-plate $l$ in back elevation. Upon removing the connecting-pieces and withdrawing the inner tube the interior surface of the outer tube is rendered accessible for cleaning purposes.

When continuous bolts are used for connecting the sections together—as, for example, with the types illustrated by Figs. 6 and 13—the latter are necessarily arranged in a direct line one above another. When, however, certain other methods of connection are employed—as, for example, that indicated in Figs. 14 and 15—the sections may be arranged as shown diagrammatically in the face view, Fig. 18, it being generally considered that the flow of the heated gases among the outer tubes becomes more completely broken up and the heat more effectually absorbed therefrom when the sections are arranged in such a manner. In this diagram, $l$ are the socket-plates, such as described with reference to Figs. 14, 15, and 17. $f$ are inner tubes, and $m\ n$, respectively, the inner and outer connecting-pieces for establishing communication between each section and the next in order. Instead of the sections being rectangular in end view, they may be hexagonal, as indicated toward the right-hand lower portion of this diagram. The spaces $q$ are filled in to prevent the heated products of combustion escaping therethrough.

Having thus fully described the nature of my invention and in what manner the same is to be performed, I would have it understood that I do not confine myself to the precise details of construction or the combinations severally represented in the drawings hereunto annexed, as many of these may be varied without departing from the principle of my invention. I further declare that I make no general claim to sectional boilers, each section of which consists of an outer or water tube communicating at each end with the section next in order and traversed longitudinally by an inner or fire tube, or several such tubes. Neither do I claim the combination of two or more tubes, carrying internally the concentric removable fire-tubes with an upper boiler, as I am aware that such an arrangement was proposed in the specification to Letters Patent of the United Kindom granted to Sir William Fairbairn, Bart., A. D. 1870, No. 810; but

I claim in respect to boilers of the kind above referred to—

1. In a steam-boiler substantially as described, a series of outer tubes, $a$, a series of inner tubes, $f$, and connecting terminal chambers $b$, in combination with each other and with connections $n$, and cup-packings $j$, expanded by the pressure of the contained fluid and forming the joint between the parts $a$ and $b$ to allow longitudinal movement to the tubes $a$, the latter being secured to the chambers by means of screw-glands applied to the inner tube or tubes, which serve as stays to resist longitudinal strain, all arranged and operating substantially as and for the purposes herein described.

2. In a steam-boiler of the compound water and fire tube type, the malleable metal outer or water tube having at each end a cast-metal chamber adapted for connection by packed joints to the adjoining section, in combination with one or more malleable metal inner or fire tubes, the latter traversing the outer tube and its terminal chambers longitudinally and being removable, substantially as and for the purposes set forth.

3. In a steam-boiler substantially as described, the combination of the fire-tubes $f$ and water-tubes $a$, arranged as described, and held by terminal chambers which make close joints to compel all the products of combustion to pass among the said tubes $a$, and the deflector K, arranged to allow a portion of the gases to pass directly to the discharge-flue, and to compel a portion to pass into the lower ends of the tubes $f$, as herein specified.

G. G. M. HARDINGHAM.

Witnesses:
  SYDNEY HOOK,
50 *Gresham House, London.*
  GEORGE COGDAHL,
*Gresham House, London.*